(12) United States Patent
Lee

(10) Patent No.: US 9,073,498 B2
(45) Date of Patent: Jul. 7, 2015

(54) BATTERY TRAY FOR VEHICLE

(71) Applicant: Hyundai Motor Company, Seoul (KR)

(72) Inventor: Hoo Gwang Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 33 days.

(21) Appl. No.: 13/917,464

(22) Filed: Jun. 13, 2013

(65) Prior Publication Data

US 2014/0158443 A1    Jun. 12, 2014

(30) Foreign Application Priority Data

Dec. 12, 2012 (KR) .................. 10-2012-0144401

(51) Int. Cl.
*B60R 16/04* (2006.01)

(52) U.S. Cl.
CPC ...................................... *B60R 16/04* (2013.01)

(58) Field of Classification Search
CPC ...... B60R 16/04; H01M 2/10; H01M 2/1016; H01M 2/1033; H01M 2/1022; H01M 2/1072; H01M 2/1077; H01M 2/1083
USPC .............................. 180/68.5; 429/100, 96, 97
See application file for complete search history.

(56) References Cited

U.S. PATENT DOCUMENTS

| | | | | |
|---|---|---|---|---|
| 2,947,373 A * | 8/1960 | Wilson | ........................ | 180/68.5 |
| 3,053,336 A * | 9/1962 | Zednik, Jr. | .................. | 180/68.5 |
| 3,420,489 A * | 1/1969 | Doggett et al. | ............. | 180/68.5 |
| 4,684,580 A * | 8/1987 | Cramer | ............................. | 429/9 |
| 4,754,827 A * | 7/1988 | Hirabayashi | ................. | 180/68.5 |
| 5,086,860 A * | 2/1992 | Francis et al. | ............... | 180/68.5 |
| 5,484,667 A * | 1/1996 | Sahli et al. | ..................... | 429/100 |
| 6,224,998 B1 * | 5/2001 | Brouns et al. | ................. | 429/100 |
| 7,014,002 B2 * | 3/2006 | Mizuta | ......................... | 180/68.5 |
| 7,331,559 B2 * | 2/2008 | Hirayu | ......................... | 248/503 |
| 7,389,841 B2 * | 6/2008 | Boville | ........................ | 180/68.5 |
| 7,543,666 B2 * | 6/2009 | Connelly et al. | ............. | 180/68.5 |
| 7,607,502 B2 * | 10/2009 | Boville | ........................ | 180/68.5 |
| 7,726,427 B2 * | 6/2010 | Picavet | ........................ | 180/68.5 |
| 8,110,300 B2 * | 2/2012 | Niedzwiecki et al. | .......... | 429/96 |
| 8,122,989 B2 * | 2/2012 | Burchett et al. | ............. | 180/68.5 |
| 8,162,191 B2 * | 4/2012 | Tetsuka et al. | ................ | 224/459 |
| 8,210,301 B2 * | 7/2012 | Hashimoto et al. | .......... | 180/68.5 |
| 8,562,036 B2 * | 10/2013 | Zhou | ............................. | 292/256 |
| 8,603,660 B2 * | 12/2013 | Houchin-Miller et al. | ... | 429/120 |
| 8,632,902 B2 * | 1/2014 | Wendorf et al. | ................ | 429/97 |
| 8,835,033 B2 * | 9/2014 | Choi et al. | ..................... | 429/100 |
| 8,859,126 B2 * | 10/2014 | Yamada | ........................ | 429/100 |
| 8,911,892 B2 * | 12/2014 | Lent et al. | ....................... | 429/99 |
| 8,936,124 B2 * | 1/2015 | Auer et al. | .................... | 180/68.5 |
| 8,951,656 B2 * | 2/2015 | Bender et al. | ................. | 429/120 |

* cited by examiner

FOREIGN PATENT DOCUMENTS

| | | |
|---|---|---|
| JP | 2006-062441 A | 3/2006 |
| JP | 2009-035215 A | 2/2009 |
| JP | 2009-509864 A | 3/2009 |

*Primary Examiner* — J. Allen Shriver, II
*Assistant Examiner* — James M Dolak
(74) *Attorney, Agent, or Firm* — McDermott Will & Emery LLP

(57) ABSTRACT

Disclosed is a battery tray for holding and supporting a battery in a vehicle. The battery tray includes a reinforcement clamp and a fixing part. The reinforcement clamp is disposed on an outer surface and vertically extends from an undersurface of the tray to an upper surface of the tray along a side wall of the tray. Fixing parts are disposed on the upper surface and the undersurface of the tray to fix both upper and lower end portions of the reinforcement clamp.

8 Claims, 5 Drawing Sheets

BATTERY TRAY FOR VEHICLE

CROSS-REFERENCE TO RELATED APPLICATION

This application claims under 35 U.S.C. §119(a) the benefit of Korean Patent Application No. 10-2012-0144401 filed Dec. 12, 2012, the entire contents of which are incorporated herein by reference.

TECHNICAL FIELD

The present disclosure relates to a battery tray for a vehicle. More particularly, the present disclosure relates to a battery tray for a vehicle, which can prevent deviation of a battery upon vehicle crash.

BACKGROUND

Generally, vehicles are equipped with a battery for supplying power to various electrical devices such as AV systems, lamps, sensors, and controllers. The vehicle batteries use a tray serving as a support for fixing the batteries when equipped in an engine compartment. The tray is mounted in vehicle body (e.g., front side member) on the front or rear side of the engine compartment. The battery is supported on the tray, and then is fixedly fastened by clamps or bolts.

The battery tray must have a structure in which the battery can be fixed and supported by the tray in a certain location inside the engine compartment and can be easily detached and attached for replacement. Also, the battery tray must have a structure that can safely secure a heavy battery such that the heavy battery does not deviate from its original location due to vibration, inertia by sudden braking, or crash impact.

FIG. 1 is a perspective view illustrating a battery tray mounted in a battery, and FIG. 2 is a perspective view illustrating a battery tray for a vehicle.

As shown in FIGS. 1, 2A, and 2B, a battery tray 120 has a wall or a stopping protrusion of a certain height along the circumference thereof to fix the battery such that the battery does not move in any direction while the battery is put into the battery tray 120. Also, a fixing unit is provided to prevent the deviation of the battery by fixing the front side and the rear side of the battery tray to safely secure the battery mounted thereon.

For example, a mounting part (only front mounting part shown) 111 protrudes from the lower end portion of the front surface and the rear surface of the battery. In this case, a protrusion part 122 may be formed on the rear end portion of the tray such that the mounting part (not shown) of the rear surface of the battery can be inserted.

Thus, when the battery 110 is mounted, the mounting part of the rear surface of the battery is inserted into the protrusion part 122 formed on the rear end portion of the tray, and then the mounting part 111 of the front surface of the battery is fixed by a clamp 124 that is fastened at the front end portion of the tray.

Thus, the battery in the battery tray 120 is fixed and supported by the protrusion part 122 fixing the mounting part 111 of the battery 110, and is prevented from deviating from the battery tray.

Upon vehicle crash, particularly a rear impact crash, the battery applies a load to the rear supporting part of the tray 120 in a rear and upward direction in which the battery 110 is lifted.

In this case, when the wall 121 and the protrusion part 122 of the rear end portion of the tray 120 do not have an appropriate thickness and strength, or when the weight of the battery is larger than the designed thickness and strength, the battery 110 deviates from the tray 120 while a breakage occurs in a bent part 123 along line 'A-A' of FIG. 2B.

When the battery tray is formed of a steel plate, deformation may occur but the probability of a breakage is low. However, when the battery tray is formed of a composite material, that is advantageous in terms of cost and weight, since the toughness is low, a breakage may occur along the bent part 123 on which a stress is concentrated.

Thus, when the bent part breaks upon crash, the battery may deviate from the tray, and the deviation of the battery may cause the interruption of power supply into the interior of a vehicle, making it difficult for a passenger to escape, resulting in a deadly accident.

In order to address this problem, an increase in the thickness of the breakage line 'A-A' was proposed, but this solution was not sufficient for different battery weights.

The above information disclosed in this Background section is only for enhancement of understanding of the background of the disclosure and therefore it may contain information that does not form the prior art that is already known in this country to a person of ordinary skill in the art.

SUMMARY

The present disclosure provides a battery tray that can effectively prevent a deviation of a battery upon vehicle crash. The present disclosure also provides a battery tray that can overcome a deviation of a battery due to a breakage of a bent part on which a stress is concentrated at a wall and a protrusion of a rear end portion that forms an uneven structure for receiving a protruding mounting part of the battery.

In one aspect, the present disclosure provides a battery tray for holding and supporting a battery in a vehicle, comprising: a reinforcement clamp disposed on an outer surface and vertically extending from an undersurface of the tray to an upper surface of the tray along a side wall of the tray. Fixing parts are disposed on the upper surface and the undersurface of the tray to fix both upper and lower end portions of the reinforcement clamp.

In an exemplary embodiment, the tray may have a wall on a rear end portion thereof and a protrusion part on an upper surface thereof, which form an uneven structure such that when the reinforcement clamp is installed on the rear end portion, the side wall and the upper surface thereof receive a protrusive mounting part of the battery, respectively.

In another exemplary embodiment, the reinforcement clamp may be attached closely to the outer surface of the tray between two ribs vertically and longitudinally protruding from the outer surface of the tray.

In still another exemplary embodiment, the reinforcement clamp may have a U-shape.

In yet another exemplary embodiment, the fixing part for the both upper and lower end portions of the reinforcement clamp may be a protrusion that is formed on the upper surface of the tray and the undersurface of the tray and is coupled with an aperture of the upper end portion and the lower end portion of the reinforcement clamp, respectively.

In still yet another exemplary embodiment, the protrusion may have a triangular shape so as to be hooked in and fixed by the aperture of the reinforcement clamp.

In a further exemplary embodiment, the reinforcement clamp may be formed of a ferro-alloy plate.

In another further exemplary embodiment, the reinforcement clamp may include a plurality of reinforcement ribs that are longitudinally disposed on the outer surface of the reinforcement clamp.

Other aspects and exemplary embodiments of the disclosure are discussed herein.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
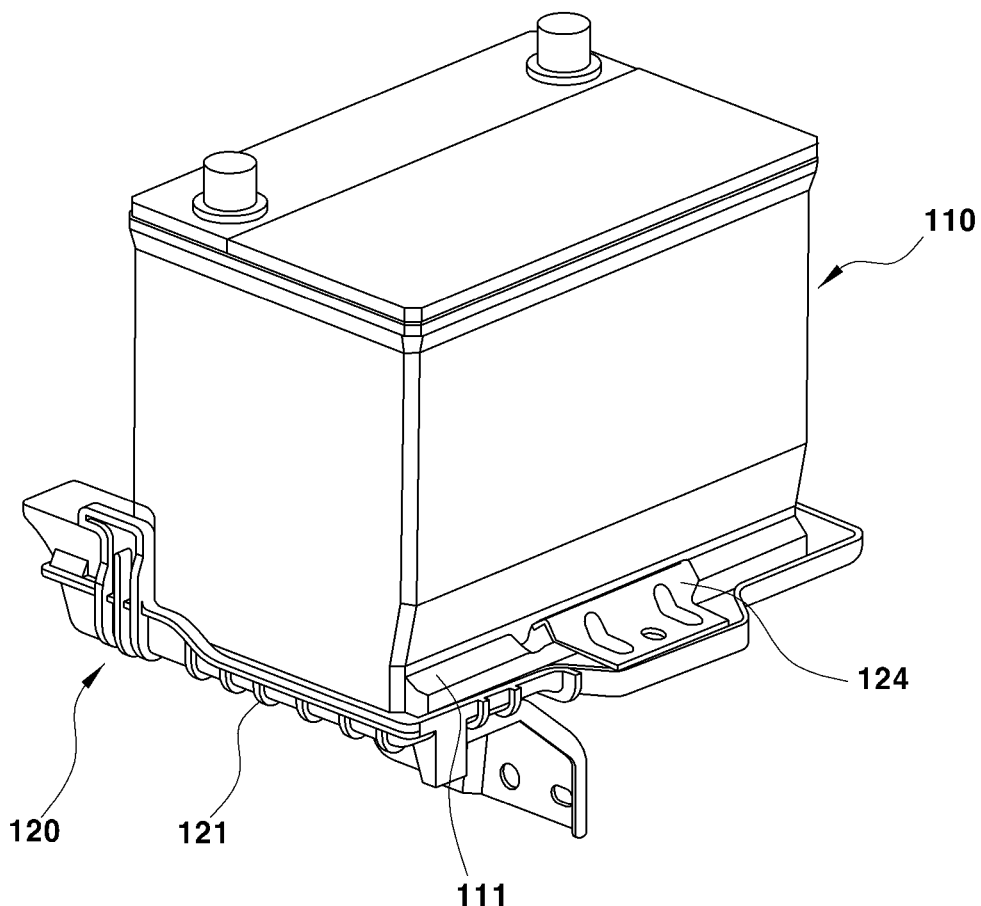
FIG. 1 is a perspective view illustrating a battery tray mounted in a battery.
Figure 2A:
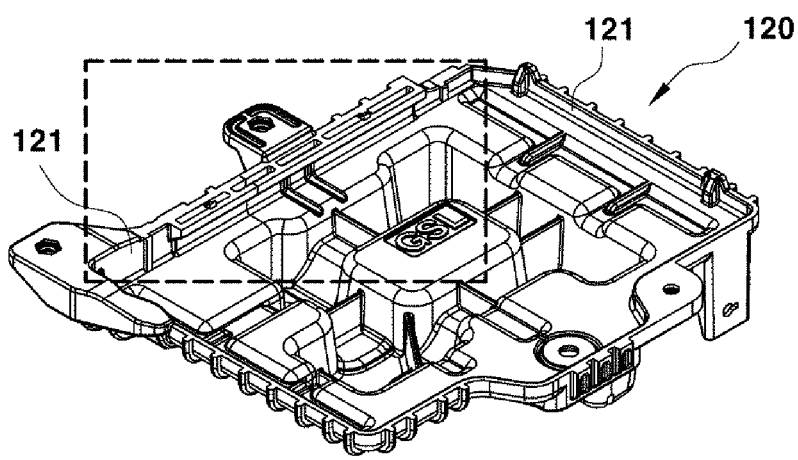
FIGS. 2A and 2B are perspective views illustrating a typical battery tray for a vehicle.
Figure 2B:
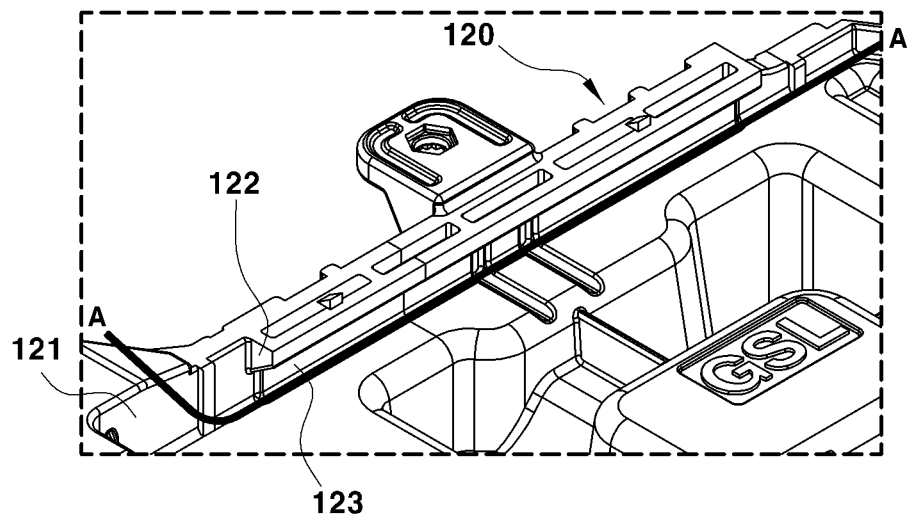

Reference numerals set forth in the Drawings includes reference to the following elements as further discussed below:

| | |
|---|---|
| 10: battery | 20: battery tray |
| 21: wall | 22: protrusion part |
| 23: bent part | 25: protrusion |
| 26: reinforcement clamp | 27: rib |
| 28: aperture | 29: reinforcement rib |
| 32: undersurface of the battery tray | 34: upper surface of the battery tray |
| 36: outer surface of the rear side of the battery tray | |
| 40: upper end portion of reinforcement clamp | |
| 42: lower end portion of reinforcement clamp | |
| 44: middle part of reinforcement clamp | |

It should be understood that the accompanying drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed herein.

Hereinafter, exemplary embodiments of the present disclosure will be described in detail with reference to the accompanying drawings so that those skilled in the art can easily carry out the present disclosure.

The present disclosure relates to a battery tray for a vehicle, and more particularly, to a battery tray for a vehicle, which can effectively prevent deviation of a battery upon vehicle crash.

Particularly, the present disclosure provides a battery tray that can overcome a deviation of a battery due to a breakage of a bent part on which a stress is concentrated at a wall and a protrusion of a rear end portion that forms an uneven structure for receiving a protruding mounting part of the battery.

Figure 3:
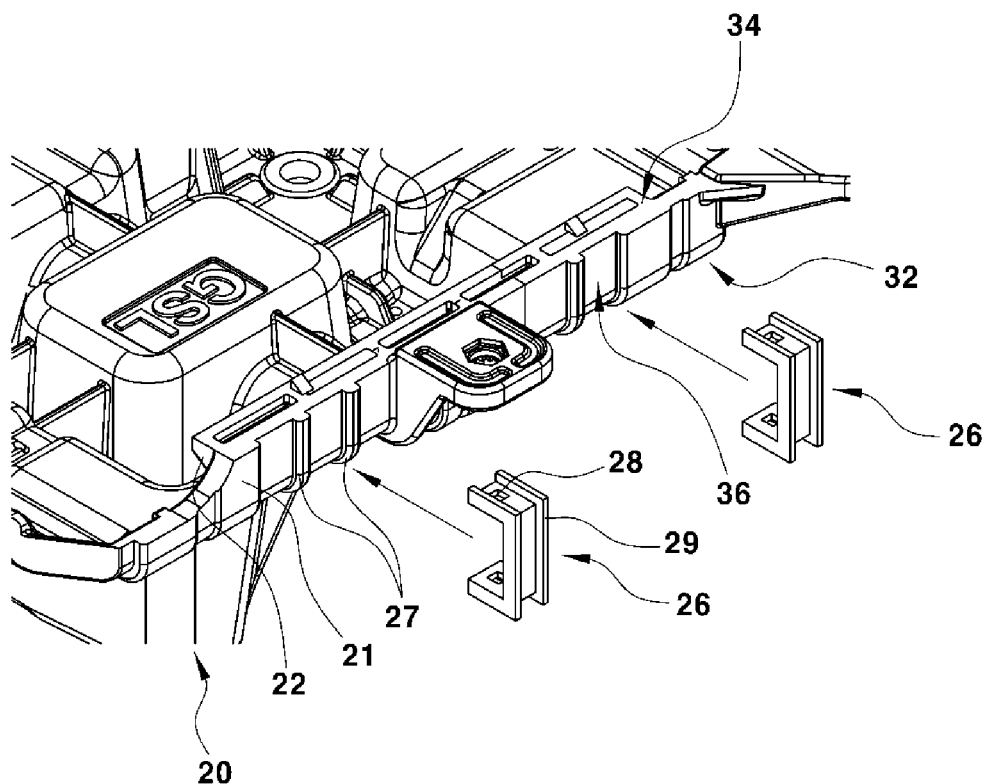
FIGS. 3 and 4 are perspective views illustrating a battery tray according to an embodiment of the present disclosure.
Figure 4:
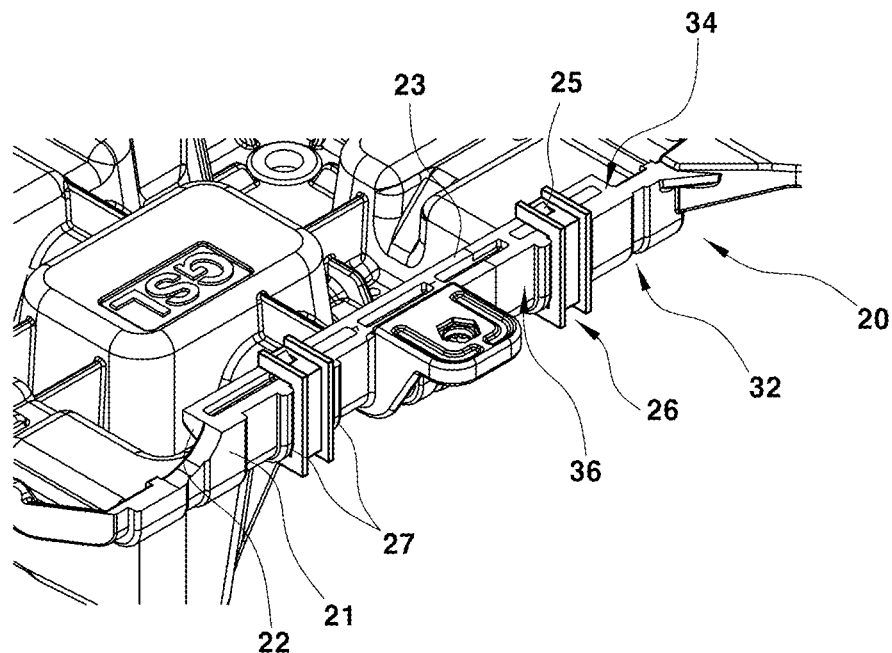

FIGS. 3 and 4 are perspective views illustrating a battery tray according to an embodiment of the present disclosure, which shows a method for mounting a reinforcement clamp. FIG. 3 illustrates a state before a reinforcement clamp 26 is assembled, and FIG. 4 illustrates a state after the reinforcement clamp is assembled.

As shown in FIGS. 3 and 4, a battery tray 20 may additionally include the reinforcement clamp 26 that increases the stiffness of the rear end portion thereof. In this case, the reinforcement clamp 26 may vertically extend from the undersurface of the battery tray 32 to the upper surface of the battery tray 34 along the outer surface of the rear side of the battery tray 36.

More specifically, the reinforcement clamp 26 may vertically extend along the undersurface 32 the rear wall (tray side wall) 36, and the upper surface 34 of a protrusion part 22. Thus, the deformation of the rear end portion of the tray 20 can be reduced upon crash, increasing the stiffness.

A plurality of reinforcement clamps 26 may be disposed at the rear end portion of the tray 20. Two ribs 27 having a protrusion shape may be vertically formed on the outer surface 36 (rear surface of the tray 20) of the rear end portion of the tray 20, and the reinforcement clamp 26 may be mounted on the mounting surface between the two adjacent ribs 27.

In this case, the inner surface of the reinforcement clamp 26 may be closely attached to the rear surface of the tray 20 (not interfering with the protrusions 27 on the rear surface of the tray 20). Also, the reinforcement clamp 26 that extends between the upper surface of the protrusion part 34 (i.e., the upper surface of the tray 20) and the undersurface of the tray 32 may stably secure the rear side of the tray 20, and can prevent unnecessary movement of the reinforcement clamp 26.

Figure 5:
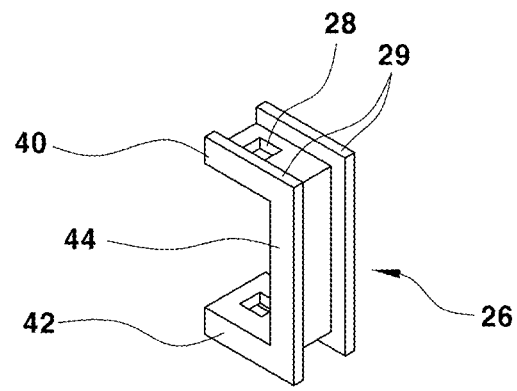
FIG. 5 is a perspective view illustrating a reinforcement clamp according to an embodiment of the present disclosure.

FIG. 5 is a perspective view illustrating a reinforcement clamp. Regarding the shape of the reinforcement clamp 26, since the reinforcement clamp 26 needs to be disposed so as to secure the rear end portion of the tray across the undersurface of the tray 32, the bent part, the rear wall, and the upper surface of the protrusion part 34, the overall shape of the reinforcement clamp 26 may be similar to a U-shape.

Also, the reinforcement clamp 26 may be formed of a metallic material such as a ferro-alloy which is flexible but is not broken by a load upon vehicle crash, unlike a composite material.

A reinforcement rib 29 may longitudinally protrude on the outer surface of the reinforcement clamp 26 along the upper and lower end portions 40, 42 and the middle part 44 connecting between the upper and lower end portions of clamp such that the bending stiffness can be supplemented.

Both end portions 40, 42 of the reinforcement clamp 26 may be fixed to the undersurface of the tray 32 and the upper surface (upper surface of the protrusion part) of the tray 34, respectively. For this, fixing parts may be provided to fix the end portions 40, 42 of the reinforcement clamp 26 to the undersurface of the tray 32 and the upper surface of the tray 34.

Thus, in order to fix the end portions 40, 42 of the reinforcement clamp 26 to the undersurface of the tray 32 and the upper surface of the tray 34, respectively, a protrusion-aperture fitting method may be used. This method allows a protrusion to be fully fitted into an aperture, unlike a fixing method using a stopping protrusion. The protrusion-aperture fitting method may enable firm fixing of the reinforcement clamp 26.

Figure 6A:
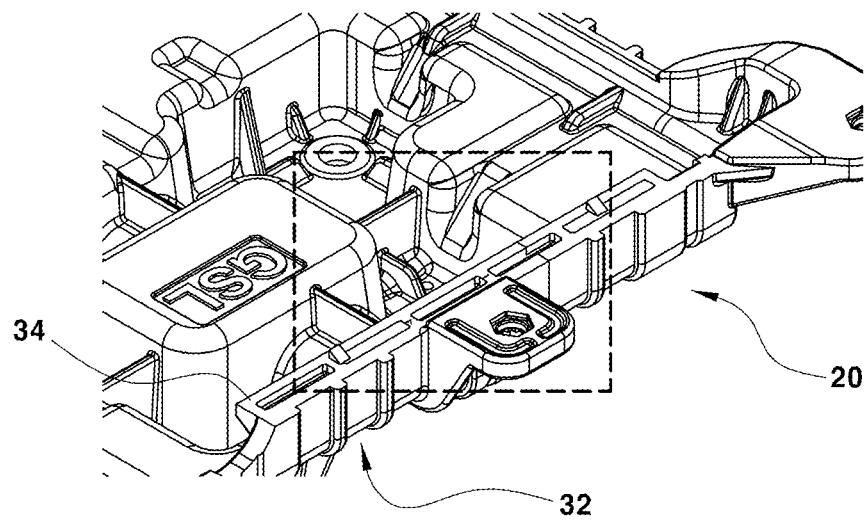
FIGS. 6A, 6B, 7A, and 7B are perspective views illustrating protrusions formed on the upper surface and the undersurface of a tray according to an embodiment of the present disclosure.
Figure 6B:
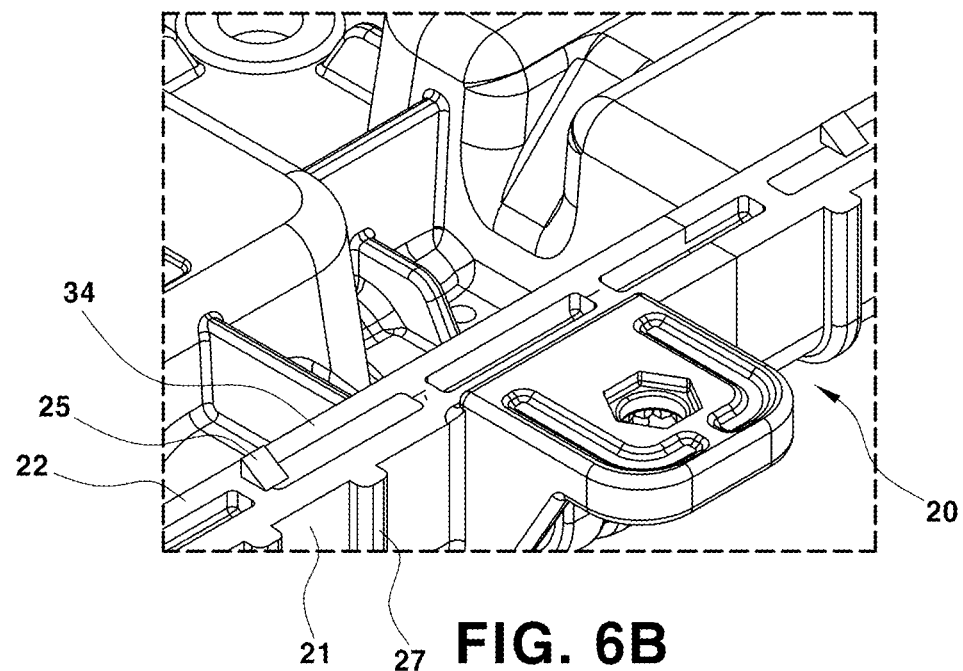
Figure 7A:
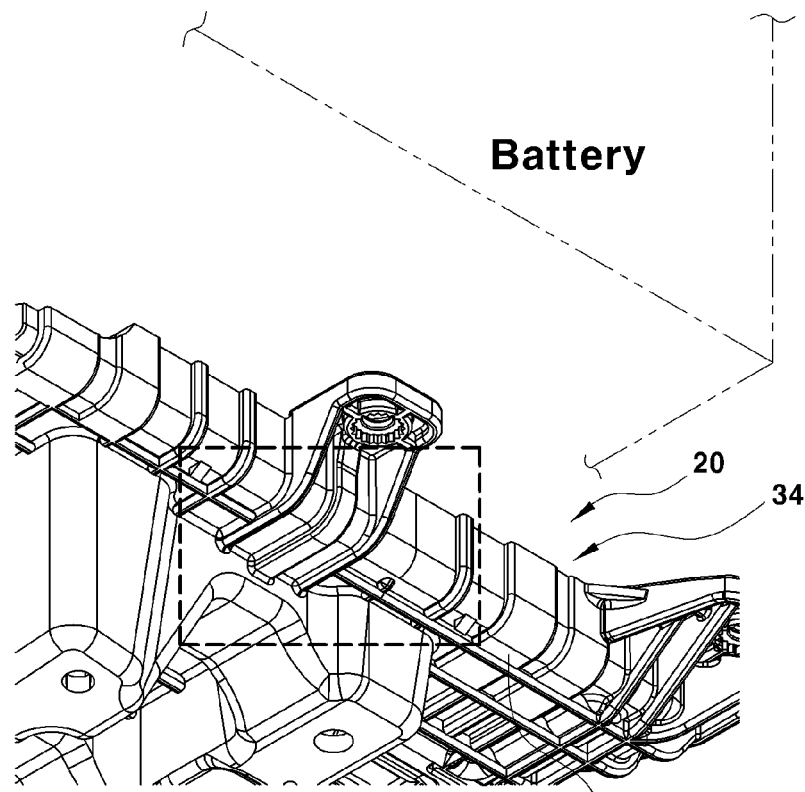
Figure 7B:
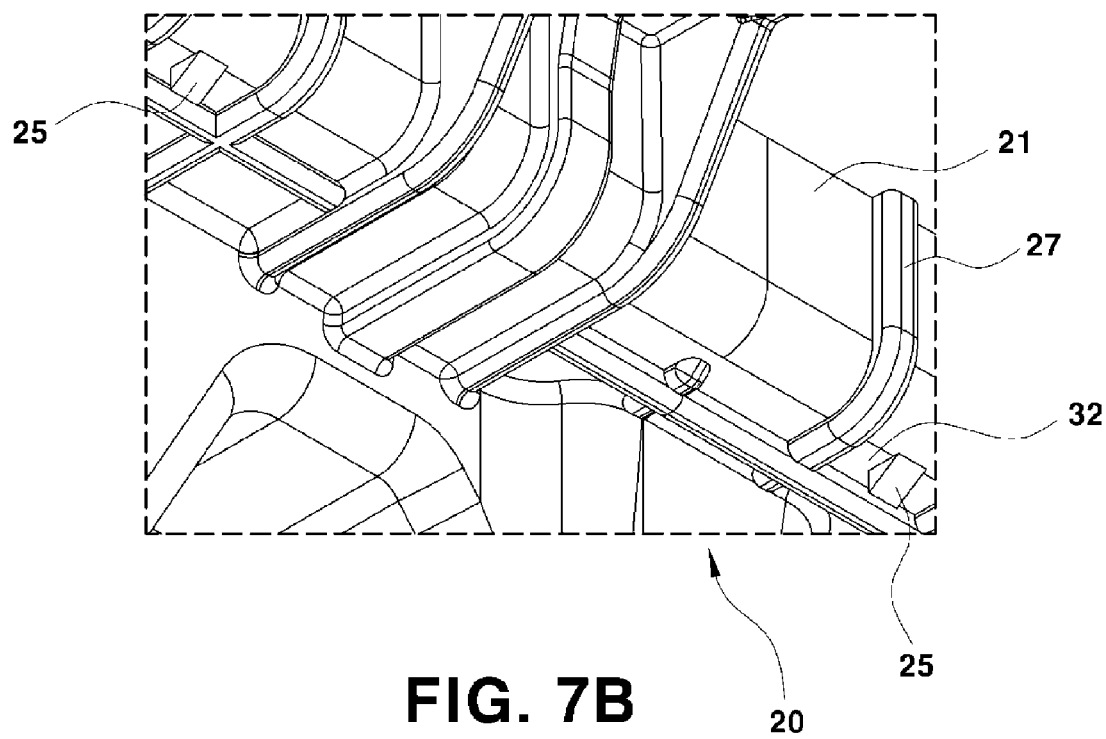

In an exemplary embodiment, a protrusion 25 may be formed on both the upper surface of the tray 34 and the undersurface of the tray 32. Also, an aperture 28 may be formed in the upper end portion 40 and the lower end portion 42 of the reinforcement clamp 26 as shown in FIG. 5, respectively. Protrusions 25 may protrude from the upper surface of the tray 34 and the undersurface of the tray 32 as shown in FIGS. 6A, 6B, 7A, and 7B. FIGS. 6B and 7B are detailed views of FIGS. 6A and 6B, respectively.

A shown in the drawings, the protrusions 25 may be formed on the upper surface (upper surface of the protrusion part for fixing the mounting part of the battery) of the tray 34 and the undersurface of the tray 32 that are the mounting surfaces of the upper end portion 40 and the lower end portion 42 of the reinforcement clamp 26, such that the protrusions 25 can be inserted into and hooked in the apertures 28 of the reinforcement clamp 26.

In this case, the protrusions 25 on the upper surface 34 and the undersurface 32 of the tray may be formed to have a triangular shape such that the reinforcement clamp 26 can be pushed into and fixed on the mounting surface of the tray 20.

When the reinforcement clamp 26 is fitted into and pushed in the mounting surface, the triangular protrusion 25 of the tray may be fitted into the aperture 28 of the reinforcement clamp 26, and thus, the assembly can be completed.

Thus, as the battery tray 20 additional includes the reinforcement clamp 26, the battery tray 20 according to the embodiment of the present disclosure can effectively prevent the battery deviation due to the breakage of the bent part 23.

Since the breakage phenomenon of the bent part mainly occurs in the battery tray using a composite material having a low toughness, e.g., a composite material in which plastic and reinforcement fiber are mixed, the configuration of this embodiment additionally including the reinforcement clamp formed of a metallic material such as a ferro-alloy plate can be usefully applied to the battery tray manufactured using a composite material.

That is, the characteristics of a composite material having a low toughness can be supplemented with a steel plate having a high toughness. The basic stiffness is provided by the composite material of tray and its own structure. Here, since the reinforcement clamp having a high toughness serves to reinforce the tray, the reinforcement clamp is not broken even when the tray is partially broken upon rear impact. Accordingly, the deviation of the battery can be prevented.

According to an embodiment of the present disclosure, since a reinforcement clamp is disposed on the outer surface of a tray such so as to vertically extend from the undersurface of a tray to the upper surface of the tray through the side wall of the tray, the deviation of a battery due to a breakage of a bent part of the tray can be overcome.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A battery tray for supporting a battery in a vehicle, comprising:
    a tray portion including
    a rear wall of the battery tray configured to support a rear surface of the battery and a protrusion part formed on the rear wall of the battery tray configured to fix a mounting part of the battery;
        a reinforcement clamp disposed on an outer surface of the rear wall and vertically extending from an undersurface of the rear wall to an upper surface of the rear wall along a side surface of the rear wall; and
        fixing parts disposed on the upper surface of the rear wall and the undersurface of the rear wall to fix both upper and lower end portions of the reinforcement clamp,
        wherein the tray portion is made of composite material and the reinforcement clamp is made of metal.

2. The battery tray of claim 1, wherein the reinforcement clamp is attached closely to the outer surface of the rear wall between two ribs vertically and longitudinally protruding from the outer surface of the rear wall.

3. The battery tray of claim 1, wherein the reinforcement clamp has a U-shape.

4. The battery tray of claim 1, wherein the fixing part for both the upper and lower end portions of the reinforcement clamp is a protrusion that is formed on the upper surface of the rear wall and the undersurface of the rear wall and is coupled with an aperture of the upper end portion and the lower end portion of the reinforcement clamp, respectively.

5. The battery tray of claim 4, wherein the protrusion has a triangular shape so as to be hooked in and fixed by the aperture of the reinforcement clamp.

6. The battery tray of claim 1, wherein the reinforcement clamp is formed of a ferro-alloy plate.

7. The battery tray of claim 1, wherein the reinforcement clamp comprises a plurality of reinforcement ribs that are longitudinally disposed on the outer surface of the reinforcement clamp.

8. The battery tray of claim 3, wherein the fixing part for both the upper and lower end portions of the reinforcement clamp is a protrusion that is formed on the upper surface of the rear wall and the undersurface of the rear wall and is coupled with an aperture of the upper end portion and the lower end portion of the reinforcement clamp, respectively.

* * * * *